(12) United States Patent
Maliskey et al.

(10) Patent No.: US 10,369,939 B2
(45) Date of Patent: Aug. 6, 2019

(54) END CAP CLIP LOCK

(71) Applicant: COOPER-STANDARD AUTOMOTIVE INC., Novi, MI (US)

(72) Inventors: Thomas E. Maliskey, Marine City, MI (US); Rod Bara, Rochester Hills, MI (US); Gina Leszczynski, Ortonville, MI (US)

(73) Assignee: COOPER-STANDARD AUTOMOTIVE INC., Novi, MI (US)

( * ) Notice: Subject to any disclaimer, the term of this patent is extended or adjusted under 35 U.S.C. 154(b) by 231 days.

(21) Appl. No.: 15/248,999

(22) Filed: Aug. 26, 2016

(65) Prior Publication Data

US 2017/0057428 A1    Mar. 2, 2017

Related U.S. Application Data

(60) Provisional application No. 62/210,207, filed on Aug. 26, 2015.

(51) Int. Cl.
| | |
|---|---|
| *B60R 13/04* | (2006.01) |
| *B60J 5/04* | (2006.01) |
| *B62D 25/04* | (2006.01) |
| *B60R 13/02* | (2006.01) |

(52) U.S. Cl.
CPC ............ *B60R 13/04* (2013.01); *B60J 5/0468* (2013.01); *B62D 25/04* (2013.01); *B60R 2013/0293* (2013.01)

(58) Field of Classification Search
CPC ....... Y10T 24/30; Y10T 24/309; Y10T 24/42; Y10T 24/44026; B60R 13/04; B60R 2013/0293
See application file for complete search history.

(56) References Cited

U.S. PATENT DOCUMENTS

| | | | |
|---|---|---|---|
| 3,245,182 A | 4/1966 | Zierold | |
| 3,742,649 A | 7/1973 | Dochnahl | |
| 3,775,927 A * | 12/1973 | Meyer | F16B 5/128 411/508 |
| 4,059,938 A | 11/1977 | Aimar | |
| 5,702,148 A | 12/1997 | Vaughan et al. | |

(Continued)

OTHER PUBLICATIONS

PCT/US2016/049059, International Search Report and Written Opinion, dated Nov. 16, 2016.
Extended European Search Report, dated Dec. 2, 2018.

*Primary Examiner* — Robert Sandy
*Assistant Examiner* — Michael S Lee
(74) *Attorney, Agent, or Firm* — Fay Sharpe LLP

(57) ABSTRACT

An end cap clip lock provides improved alignment of first and second vehicle trim components to a vehicle. The end clip lock includes a clip dimensioned for receipt between the first vehicle trim component or applique and the vehicle, such as the vehicle door. The clip includes a nose portion configured for receipt in the first vehicle trim component or reveal and a second, snap portion that interconnects with the second vehicle trim component or applique. The clip is joined to the vehicle door panel to hold the clip and the second associated vehicle trim component or applique thereto. Preferably, the end cap clip lock is installed into the reveal to form a subassembly, the subassembly is installed on the vehicle, and then the applique is installed on the subassembly/vehicle.

20 Claims, 7 Drawing Sheets

(56) References Cited

U.S. PATENT DOCUMENTS

| | | |
|---|---|---|
| 6,416,113 B1 | 7/2002 | Page |
| 6,681,526 B2 | 1/2004 | Mueller et al. |
| 6,918,223 B2 | 7/2005 | Neidlein |
| 7,055,291 B2 | 6/2006 | Nakanishi et al. |
| 7,407,205 B2 | 8/2008 | Nakao et al. |
| 8,517,442 B1 | 8/2013 | Agnew et al. |
| 8,572,897 B2 | 11/2013 | Dishman et al. |
| 8,578,677 B2 | 11/2013 | Aoi et al. |
| 8,740,276 B2 | 6/2014 | Takeyoshi |
| 8,819,997 B2 | 9/2014 | Bouvatier |
| 8,882,175 B2 | 11/2014 | Drake et al. |
| 2005/0189782 A1 | 9/2005 | Fujita et al. |
| 2010/0313487 A1 | 12/2010 | Ellis et al. |
| 2012/0091746 A1 | 4/2012 | Zimmer |
| 2012/0110796 A1* | 5/2012 | Klein .................... F16B 21/084 24/457 |
| 2014/0265455 A1 | 9/2014 | Fulton |

* cited by examiner

END CAP CLIP LOCK

This application claims the priority benefit of U.S. provisional application Ser. No. 62/210,207, filed Aug. 26, 2015, the entire disclosure of which is expressly incorporated herein by reference.

BACKGROUND

The present disclosure relates to automotive vehicles, and more particularly to attachments of one or more mating parts or components to improve the fit and finish of the components to one another and/or to the vehicle.

Multiple trim components are typically used around a perimeter of a vehicle window. For example, a B or C pillar of the vehicle is often covered by a first trim component on the vehicle door generally referred to as an appliqué. Likewise, additional trim components are provided along a header portion of the window opening in the vehicle door, commonly referred to as a reveal, and still another trim component is provided along the base or beltline of the window opening.

An increased need exists for improving the fit of these components to one another, and also to the vehicle. In addition, a need exists for improving the finish of these components relative to one another, and relative to the vehicle.

SUMMARY

The present disclosure assembles multiple trim components together, and also provides for assembly of the components onto a substrate.

The present disclosure is directed to an end cap clip lock for improved alignment of first and second trim components, e.g., an associated reveal and appliqué, and for joining to an associated vehicle. The end clip lock includes a clip dimensioned for receipt between the associated appliqué and the associated vehicle. The clip includes a nose portion configured for receipt in a first associated vehicle trim component such as a reveal (to form a subassembly), and a second, snap portion that interconnects with the second associated vehicle trim component or appliqué, to hold the clip and associated vehicle trim component thereto.

The snap portion in a preferred arrangement includes spaced apart engagement sections.

The engagement sections include chamfered lead-in surfaces facing outwardly from the clip and dimensioned for receipt into an associated opening in the vehicle door.

The engagement sections each include an undercut spaced inwardly from the lead-in surfaces to form a shoulder that engages the associated vehicle door around the window opening.

The nose portion includes a tapered surface that guides the nose portion into the first associated vehicle trim component or reveal.

The clip further includes an end cap formed thereon that is dimensioned for abutting engagement with the first associated vehicle trim component or reveal.

The end cap forms a shoulder that abuts with an associated end of the first associated vehicle trim component or reveal.

The snap portion includes spaced apart engagement sections.

The nose portion, snap portion, and end cap of the clip lock are a single, homogeneous molded component.

The clip has interlock feature for securing the clip and the first associated vehicle trim component to the second associated vehicle trim component or appliqué, and to the vehicle.

A method of securing vehicle trim components to a vehicle includes providing a lock clip having a snap portion, installing the lock clip on the first vehicle trim component or reveal to form a subassembly, securing the snap portion of the lock clip or subassembly to the vehicle door, and subsequently installing the second vehicle trim component or appliqué.

The lock clip installing step includes advancing a first end of the lock clip into the first vehicle trim component or reveal to form a subassembly.

The method further includes installing the second vehicle trim component or appliqué to the subassembly, particularly using the lock clip to secure the first vehicle trim component or reveal to the second vehicle trim component or appliqué.

The method further includes shipping the first vehicle trim component with the lock clip installed thereto to a vehicle assembly plant.

The advancing step includes sliding the lock clip relative to the first vehicle trim component until an end cap abuts against an end of the first vehicle trim component or reveal.

The method further includes fastening the second vehicle trim component or appliqué to the first vehicle trim component or lock clip.

The fastening step includes providing a clip on a rear surface of the appliqué adapted to receive a fastener extending through the lock clip.

The method further includes staking the clip to the rear surface of the appliqué.

The method further includes heat staking the clip to the rear surface of the appliqué.

The snap portion securing step is prior to the lock clip installing step.

Benefits and advantages of the present disclosure will become more apparent from reading and understanding the following detailed description.

DETAILED DESCRIPTION

Figure 1:
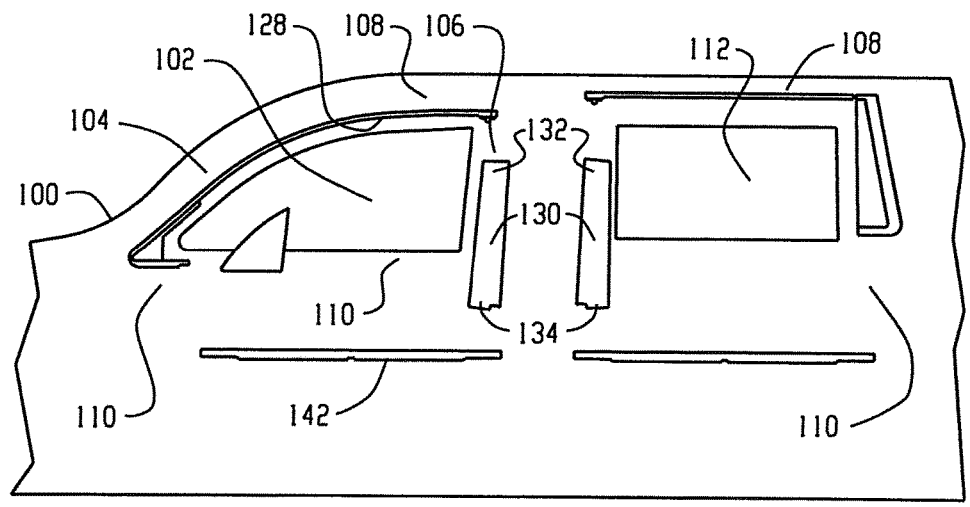
FIG. 1 is a schematic representation of a portion of a vehicle illustrating a first or front window opening, and a second or rear window opening.

Turning to FIG. 1 there is shown a portion of a vehicle 100. The vehicle 100 includes a door having a first or front window opening 102 that generally extends in a first or front-to-rear direction between a first or A pillar 104 portion of the vehicle door and a second or B/C pillar 106 portion of the door. In addition, the front window opening 102 extends in a second or height direction between a header 108 and a beltline 110 of the vehicle door. In a similar manner, a rear door includes a second or rear window opening 112 that generally extends in the first or front-to-rear direction between the second or B/C pillar 122 and a third or C/D pillar 124 and in the second or height direction between the header 108 and the beltline 110. Of course one skilled in the art will appreciate that this is common nomenclature for a vehicle with front and rear windows on each side of the vehicle, and may also apply to vehicles that have only a single window or more than two windows on each side such as may be encountered in passenger or commercial vehicle applications.

It is common to employ multiple vehicle trim components around different portions of the window openings 102, 112. For example, it is common to employ a first vehicle trim component or reveal 128 and a second vehicle trim component often referred to as an appliqué 130 (see also FIGS. 2-3) along the B pillar or C pillar 106 of the vehicle door. The appliqué 130 typically has a height and width for receipt on the vehicle door and that covers the B/C pillar 106. Therefore, the appliqué 130 is made from a material having a desired surface finish or show surface that faces outwardly from the vehicle door along the pillar 106, for example a high gloss finish is often desirable, or a finish of a desired color that accents or matches other colors used in the vehicle. The appliqué 130 has a first or upper end 132 and a second or lower end 134 that abut against separate vehicle trim components, namely, the reveal 128 abuts the applique along the header 108 and a seal assembly 142 abuts the applique along the beltline 110.

As a result of using multiple trim components around the vehicle window openings, it is important to maintain a good fit and finish between the vehicle trim components 128, 130, 142, and/or between the trim components and vehicle 100. To that end, the present disclosure provides a unique structure and method of holding at least select individual components together and also holding the components to the substrate (vehicle door) prior to final fastening or securing of the components thereto. Advantageously, the arrangement also potentially eliminates use of a mechanical fastener as a result of combining fastening features together in the assembly.

Figure 2:
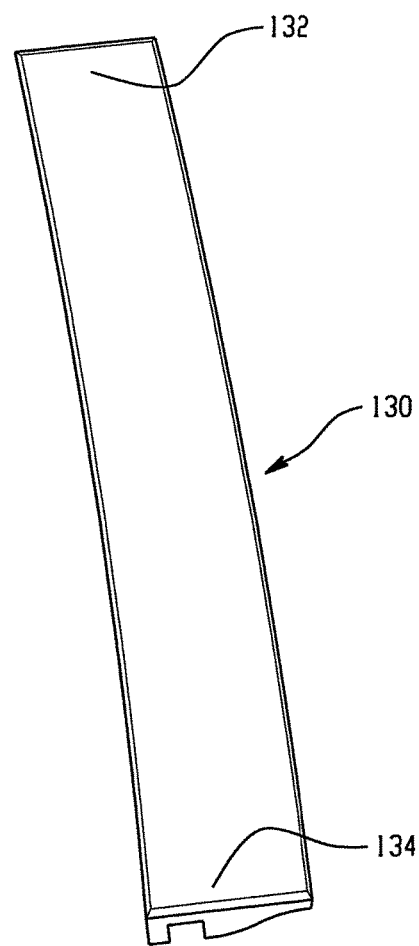
FIG. 2 shows a vehicle trim component or appliqué.
Figure 3:
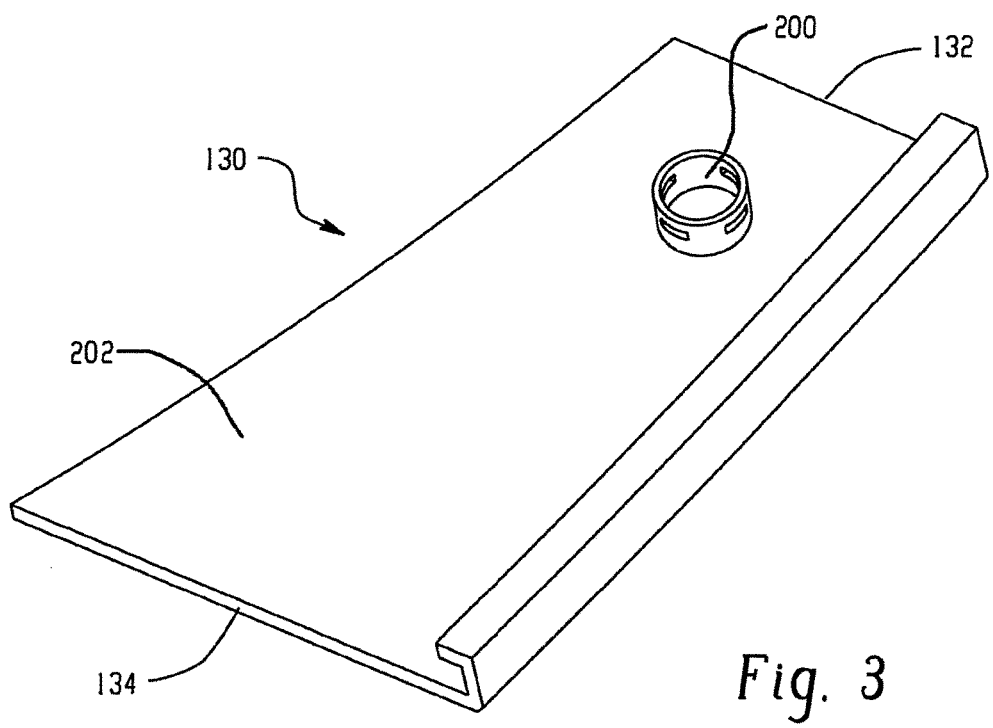
FIG. 3 shows a rear face of the appliqué of FIG. 2.

More specifically, and with continued reference to FIGS. 1-3, and additional reference to FIGS. 4-12, there is shown an end cap clip lock 160 that resolves these issues and others. A preferred arrangement of the end cap clip lock 160 includes a first or upper nose portion 162 having tapering surfaces 162a, 162b, 162c that are disposed relatively orthogonal to one another for guiding receipt of the nose portion into an inner cavity 128a of the first vehicle trim component or reveal 128 (see FIG. 11). That is, the reveal 128 has a generally C-shaped cross-section and partially encloses the inner cavity 128a. The first, nose portion 162 of the end cap clip lock 160 is thus dimensioned for sliding receipt within the cross-sectional dimension of the inner cavity 128a of the reveal 128. Further, the outer surface of the nose portion 162 is dimensioned to form a secure friction fit with the inner surface of the reveal 128 so that once the nose portion is inserted therein, the end cap clip lock 160 is joined to the reveal trim component.

Continued axial advancement of the end cap clip lock 160 proceeds until an inner surface or enlarged shoulder 164 of end cap 166 (that is longitudinally spaced at an opposite end or at a location spaced from the nose portion 162) abuts against a terminal end of the reveal 128. This abutting engagement between the end cap 166 and the terminal end of the reveal 128 provides the desired closeout finish of the reveal. Advantageously, this installed position of the end cap clip lock 160, as determined by the abutment of end cap 166 with the reveal 128, also positions a snap portion 180 of the end cap clip lock at a desired location for connection with the second vehicle trim component or appliqué 130 as will be described further below.

Figure 12:
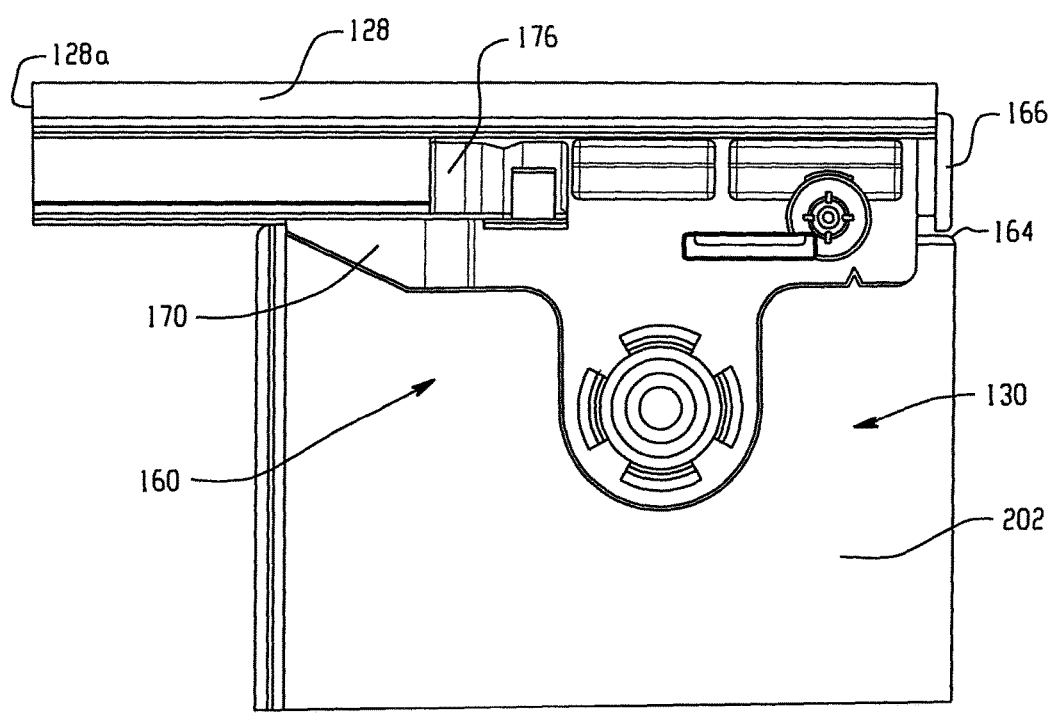
FIG. 12 is a rear elevational view of the reveal joined to the appliqué with the end cap clip lock mounted thereto.

To further guide advancement and positioning of the end cap clip lock 160 relative to the reveal 128, a second nose portion 170 extends outwardly from the end cap clip lock. The second nose portion 170 is preferably positioned at a location below that of the first nose portion 162. A cutout or gap 172 located between the first and second nose portions 162, 170 extends inwardly from terminal ends of the respective nose portions a dimension that matches a notch 176 formed in a lower leg portion of the reveal 128 (FIG. 12). Thus, as the end cap clip lock 160 is axially advanced into the terminal end of the reveal 128, the first nose portion 162 proceeds into the internal cavity 128a of the reveal, while the second nose portion 170 guides or tracks along the lower external surface of the reveal. This axial advancement of the end cap clip lock 160 continues until the end cap clip lock gap edge 172 engages a surface forming the notch 176 in the lower portion of the reveal 128, and the end cap 166, namely the internal shoulder 164 thereof, abuts against the terminal end of the reveal.

Figure 4:
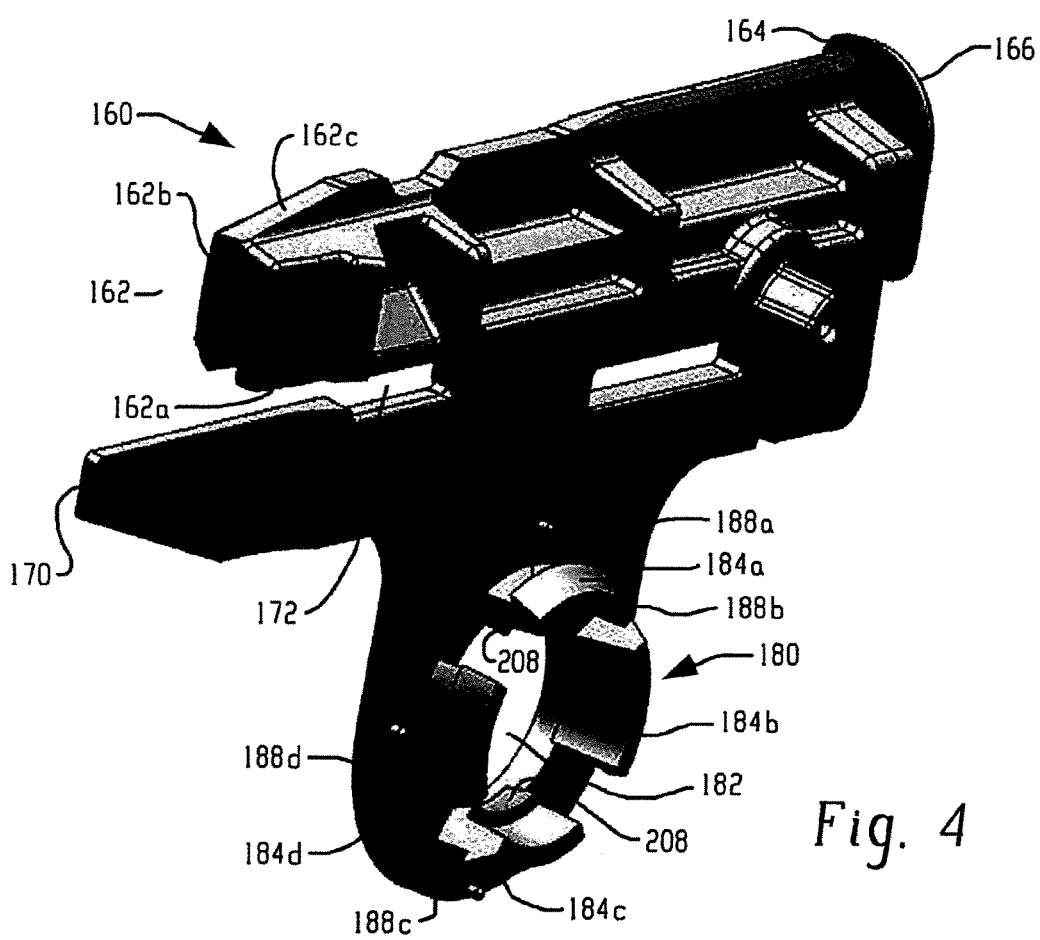
FIG. 4 is a perspective view of an end cap clip lock.
Figure 5:
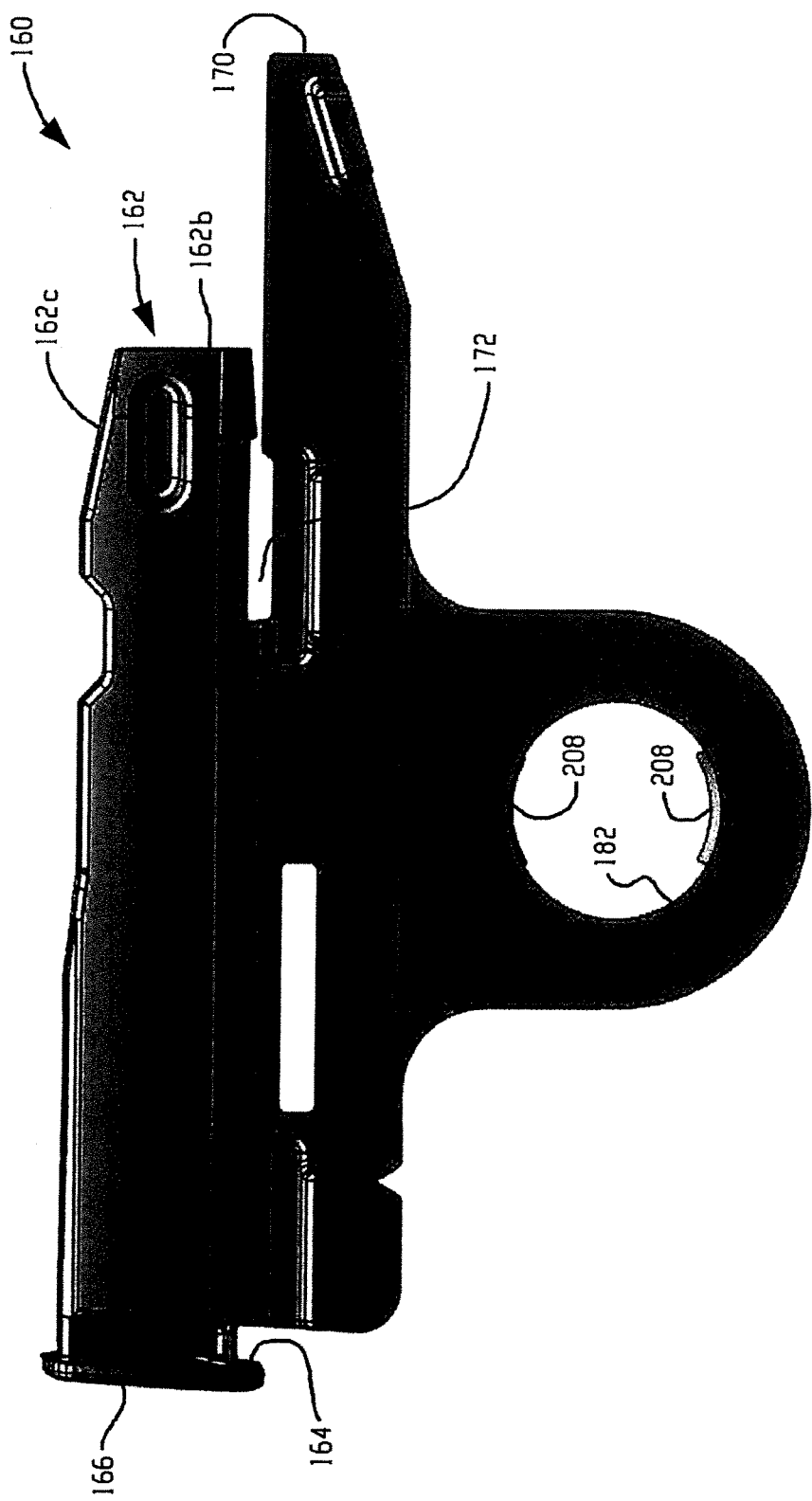
FIG. 5 is a front elevational view of the end cap clip lock.
Figure 6:
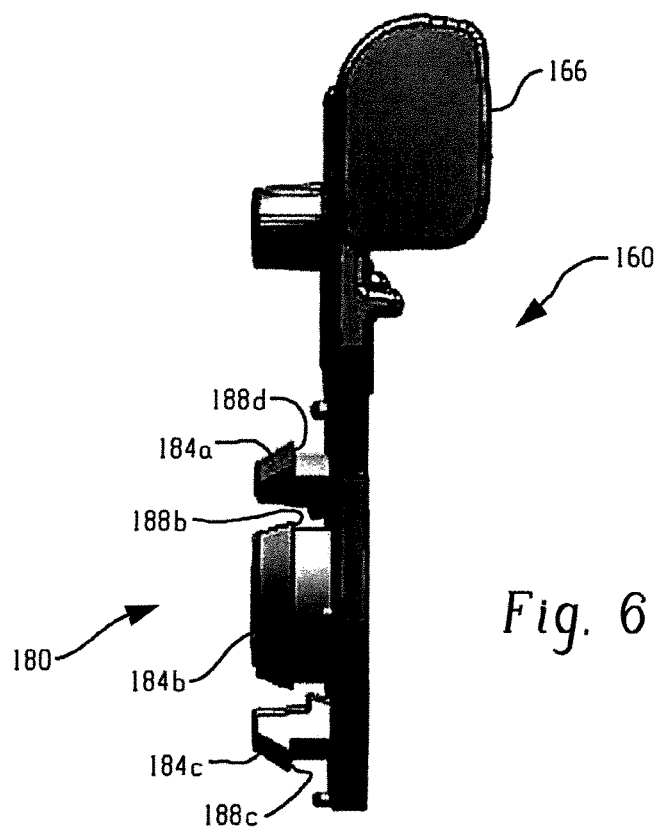
FIG. 6 is an end elevational view of the end cap clip lock taken from the left-hand end of FIG. 5.
Figure 7:
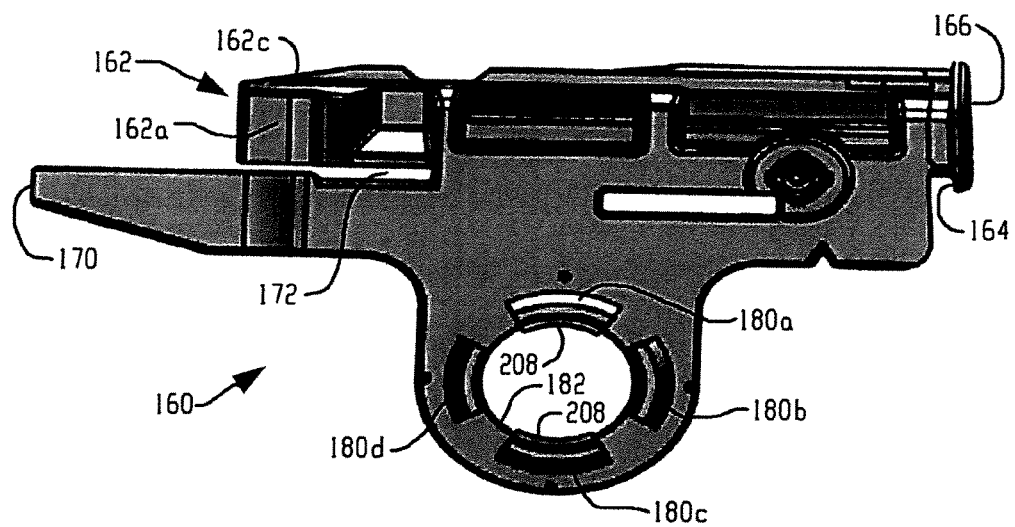
FIG. 7 is a rear elevational view of the end cap clip lock.
Figure 8:
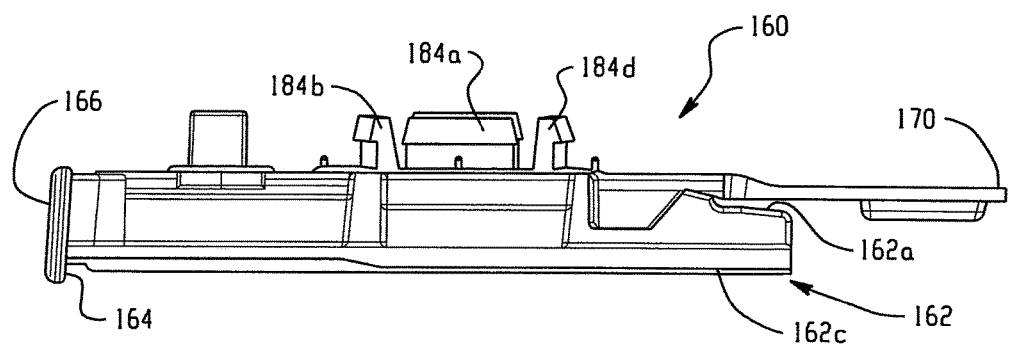
FIG. 8 is a top view of the end cap clip lock.
Figure 9:
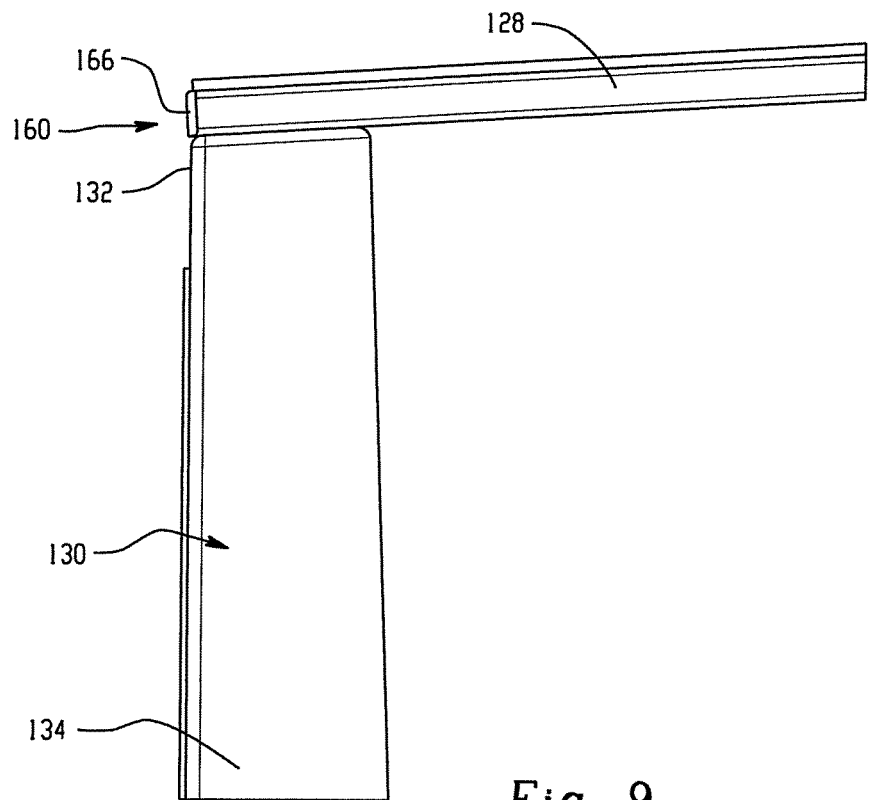
FIG. 9 is a front elevational view of the first vehicle trim component, or reveal, joined to the second vehicle trim component, or appliqué, with the end cap clip lock mounted thereto.
Figure 10:
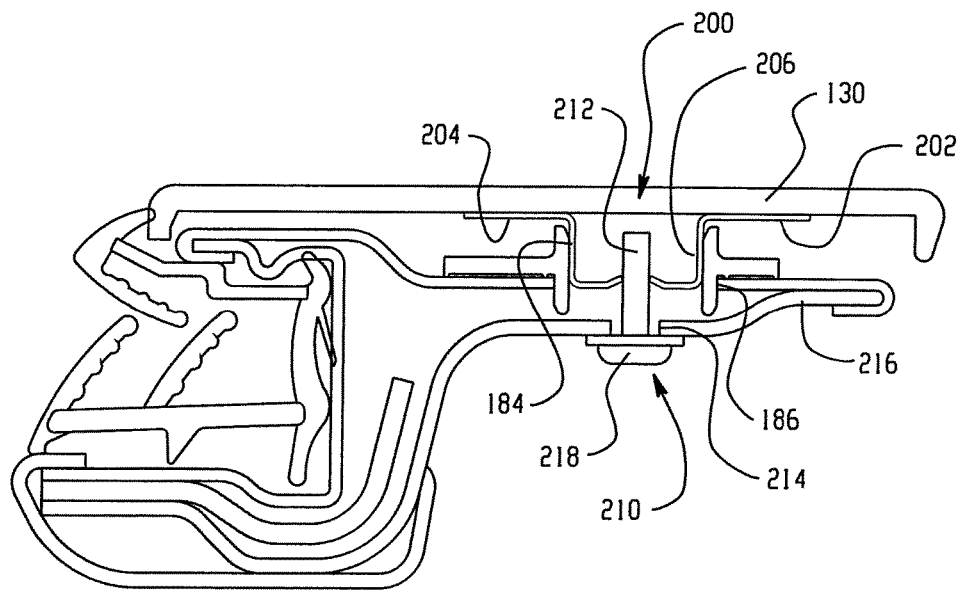
FIG. 10 is a cross-sectional view taken generally along the lines 10-10 of FIG. 9.
Figure 11:
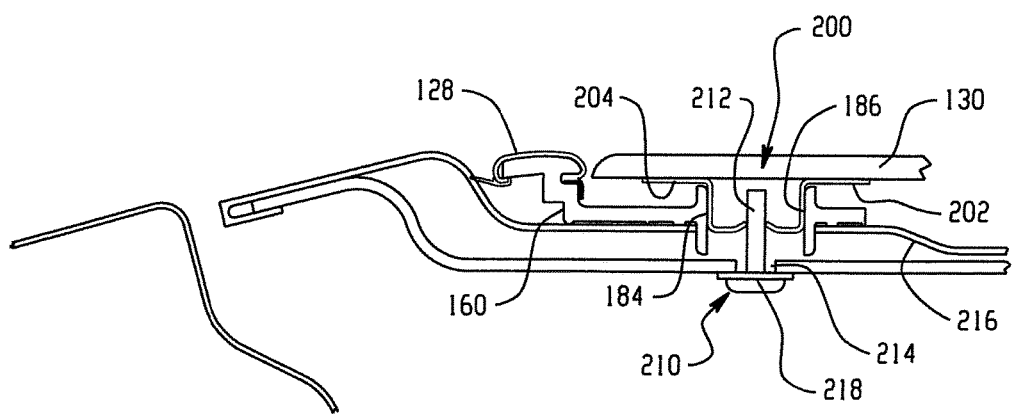
FIG. 11 is a cross-sectional view taken generally along the lines 11-11 of FIG. 9.

The snap portion 180 of the end cap clip lock 160 is preferably positioned below the first and second nose portions 162, 170 (FIGS. 4-7). Particularly, the snap portion 180 extends outwardly from one face of the end cap clip lock 160 and is positioned around a perimeter of an opening 182 that extends through the end cap clip lock. In a preferred arrangement, the snap portion 180 is formed by segmented portions or engagement sections 180a-d that are spaced apart in a circumferential direction around the opening 182 (FIG. 7). The engagement sections 180a-d include chamfered lead-in surfaces 184a-d, respectively, (FIG. 4) facing outwardly from the end cap clip lock 160. The chamfered lead-in surfaces 184a-d are dimensioned for receipt into an associated opening 186 in the vehicle 100 (FIGS. 10-11). The engagement sections 180a-d each include an undercut spaced inwardly from the lead-in surfaces to form a shoulder 188a-d (FIG. 4). Each shoulder 188a-d engages the associated vehicle 100 around the opening 186. As particularly shown in FIGS. 10-11, the lead-in surfaces 184a-d of the individual engagement sections 180a-d extend through, for example, a portion of the vehicle, particularly the outer door panel of the vehicle 100.

In addition, a clip 200 is staked, preferably heat staked, to a rear face 202 of the second vehicle trim component or appliqué 130. A flange or shoulder portion 204 (FIGS. 10-11) of the clip 200 is secured, for example by heat staking the flange portion 204 to the applique 130 to secure the clip to the appliqué. In addition, a central portion 206 of the clip 200 extends outwardly from the flange portion 204 and the central portion has an outer dimension for close receipt in the opening 182 of the end cap clip lock 160 (FIGS. 10-11). Thus the end cap clip lock 160 aligns the trim components, namely the reveal 128 and appliqué 130, to one another. In addition, the end cap clip lock 160 aligns the joined trim components (reveal 128 and applique 130) to the vehicle 100 via the engagement sections 180a-d. Thus, both fit and finish of the individual trim components 128, 130 relative to one another, and the joined trim components (128, 130, via the end cap clip lock 160) relative to the vehicle 100 are improved.

This can be accomplished in different ways, although the preferred manner is to secure the end cap clip lock 160 to the first trim component or reveal 128 as described above to form a subassembly. The subassembly is then preferably affixed to the vehicle by connecting the snap fit portion 180 of the subassembly into the opening 180 of the vehicle. Next, the second trim component or applique 130 is temporarily secured and aligned to the subassembly via protrusions or flanges 208 (located at spaced circumferential locations around the opening 180 in the end cap clip lock—see FIGS. 4, 5, 7 and then fastened to the vehicle so that the reveal 128 and applique 130 are joined to the vehicle As perhaps best illustrated in FIGS. 10-12, fastener 210 includes a shank portion 212 that is engaged by the clip 200. The shank portion 212 has a cross-sectional dimension slightly less than the opening 214 through the inner door panel 216 whereby the shank portion 212 passes therethrough for engagement with the clip 200. In addition, a head portion 218 of the fastener 200 is disposed at one end of the shank portion 212 of the fastener and thus tightly secures the appliqué 130 to the outer door panel of the vehicle.

As additionally evident in FIG. 12, the second nose portion 170 of the end cap clip lock also abuts against an inwardly folded edge 220 of the appliqué 130. Again, this additionally contributes to the fit and finish of the reveal 128 to the appliqué 130, and likewise contributes to the fit and finish of the joined reveal and appliqué to the vehicle.

This written description uses examples to describe the disclosure, including the best mode, and also to enable any person skilled in the art to make and use the disclosure. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Moreover, this disclosure is intended to seek protection for a combination of components and/or steps and a combination of claims as originally presented for examination, as well as seek potential protection for other combinations of components and/or steps and combinations of claims during prosecution.

It is claimed:

1. An end cap clip lock for improved alignment of first and second associated trim components to one another and to an associated vehicle body, the end cap clip lock comprising:
a clip having a first nose portion configured for receipt in the first associated vehicle trim component, and dimensioned for receipt between the second associated trim component and the associated vehicle, and a second nose portion disposed in parallel relation to the first nose portion and positioned to engage an external surface of the first associated vehicle trim component and to guide the clip along the external surface, and the clip further including a second, snap portion that interconnects with the associated vehicle to hold the clip and the second associated vehicle trim component thereto.

2. The clip lock of claim 1 wherein the snap portion includes spaced apart engagement sections.

3. The clip lock of claim 2 wherein the engagement sections include chamfered lead-in surfaces facing outwardly from the clip and dimensioned for receipt into an associated opening in the vehicle body.

4. The clip lock of claim 3 wherein the engagement sections each include an undercut spaced inwardly from the lead-in surfaces to form a shoulder that engages the associated vehicle body around the opening.

5. The clip lock of claim 1 wherein the first nose portion includes a tapered surface that guides the nose portion into the first associated vehicle trim component.

6. The clip lock of claim 1 wherein the clip further includes an end cap formed thereon that is dimensioned for abutting engagement with the first associated trim component.

7. The clip lock of claim 6 wherein the end cap forms a shoulder that abuts with an associated end of the first associated trim component and limits further advancement of the clip into the first vehicle trim component.

8. The clip lock of claim 7 wherein the snap portion includes spaced apart engagement sections.

9. The clip lock of claim 8 wherein the nose portion, snap portion, and end cap of the clip lock are a single, homogeneous molded component.

10. The clip lock of claim 1 further comprising a cutout between the first and second nose portions.

11. An end cap clip lock for improved alignment of first and second associated trim components to one another and to an associated vehicle body, the end cap clip lock comprising:
a clip having a first nose portion configured for receipt in the first associated vehicle trim component, and dimensioned for receipt between the second associated trim component and the associated vehicle, the clip further including a second, snap portion that interconnects with the associated vehicle to hold the clip and the second associated vehicle trim component thereto, wherein the first trim component forms at least a portion of a reveal along a header of the associated vehicle body and the second trim component forms at least a portion of an appliqué covering a pillar of the associated vehicle, the clip first nose portion being received in the reveal and the snap portion operatively engages the appliqué.

12. The clip lock of claim 11 wherein the clip includes a second nose portion adjacent to the first nose portion that guides the clip along an external surface of the reveal.

13. The clip lock of claim 12 further comprising a cutout between the first and second nose portions.

14. The clip lock of claim 12 wherein the reveal includes an axial notch extending from an end of the reveal whereby the surface of the cutout abuts against the notch upon complete insertion of the clip into the reveal.

15. The clip lock of claim 14 further comprising an end cap having a dimension greater than an inner cavity of the reveal whereby the end cap abuts a terminal end of the reveal and provides the desired closeout finish of the reveal.

16. The clip lock of claim 12 wherein the snap portion is located on a portion of the clip that extends orthogonally relative to the first and second nose portions.

17. The clip lock of claim 16 wherein the reveal and the appliqué extend orthogonally relative to one another.

18. The clip lock of claim 16 further comprising a clip secured to the appliqué wherein the clip includes a flanged portion dimensioned for receipt in an opening of the snap portion of the clip.

19. The clip lock of claim 18 wherein the snap portion includes engagement portions circumferentially spaced around the opening for snap-fit engagement with an associated opening in the vehicle.

20. The clip lock of claim 19 wherein the snap portion includes flanges circumferentially spaced around the opening for snap-fit engagement of the end cap clip lock to the appliqué.

* * * * *